March 28, 1944.  C. L. COX, JR  2,345,240
SWITCH
Filed Nov. 5, 1942   3 Sheets-Sheet 1
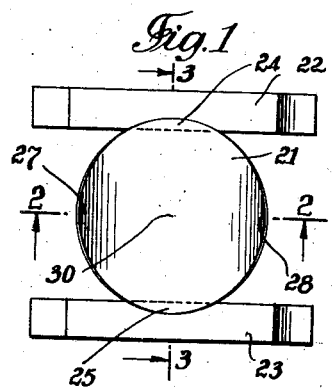
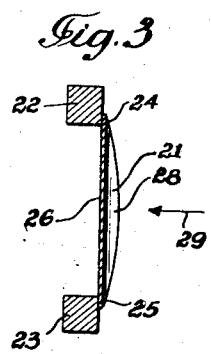
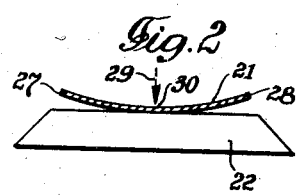
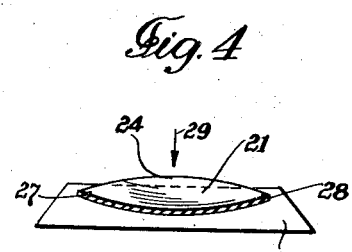
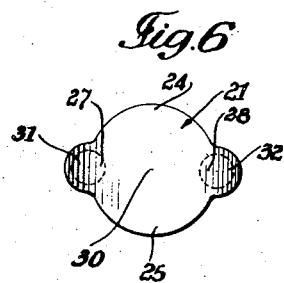
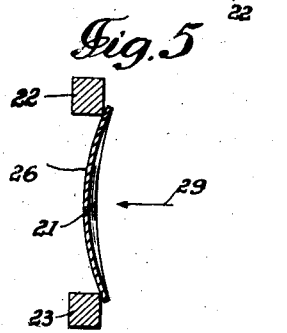
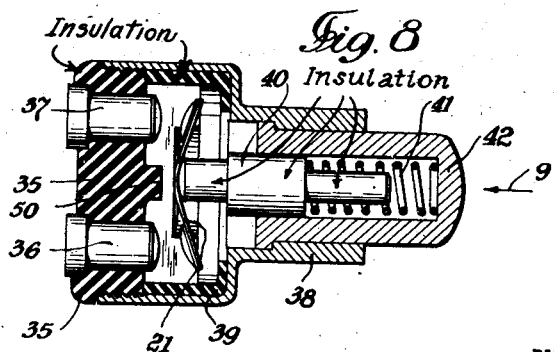
INVENTOR:
Charles L. Cox, Jr.
BY

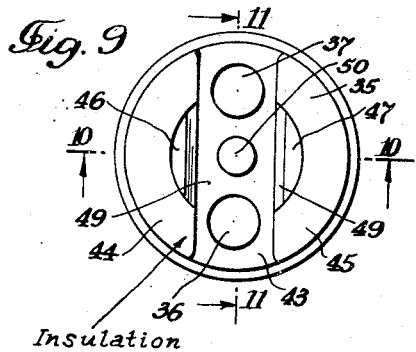
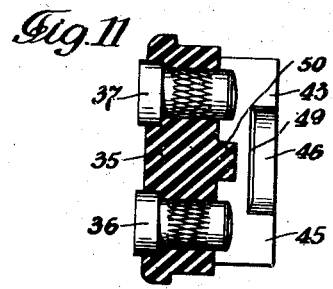
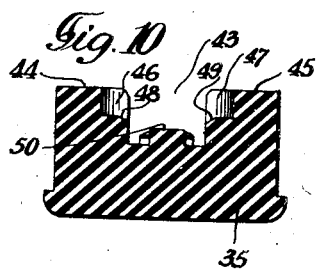
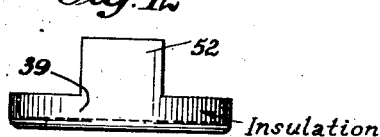
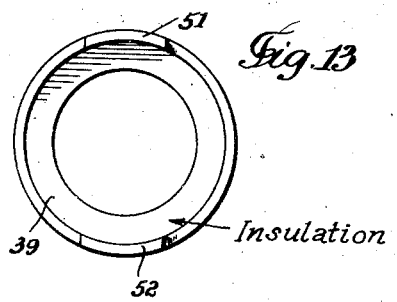
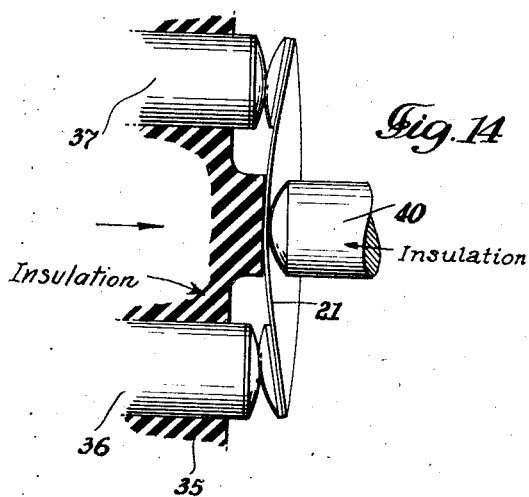

March 28, 1944.  C. L. COX, JR  2,345,240
SWITCH
Filed Nov. 5, 1942  3 Sheets-Sheet 3
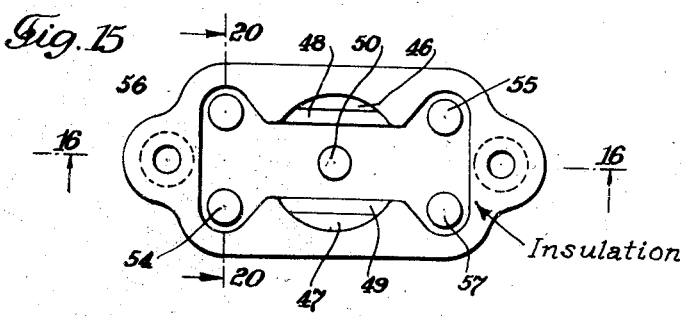
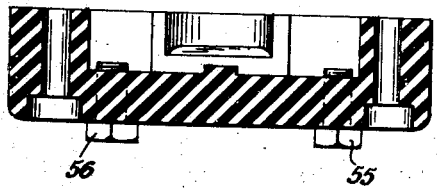
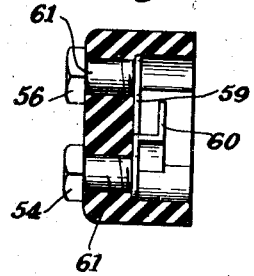
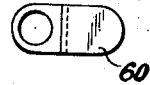
INVENTOR:
Charles L. Cox, Jr.
BY
his  Agent Patented Mar. 28, 1944

2,345,240

UNITED STATES PATENT OFFICE 2,345,240

SWITCH

Charles L. Cox, Jr., Sharon Hill, Pa., assignor to Robert Hetherington and Son, Inc., Sharon Hill, Pa., a corporation of Delaware Application November 5, 1942, Serial No. 464,603

16 Claims. (Cl. 200—67)

The present invention relates to electric switches, and more particularly to snap switches.

It is an object of the present invention to provide an unstressed wing type double-break or double-contact snap switch which is particularly simple and reliable in operation.

It is another object to provide a switch in which the distance between the contact points is relatively large compared to the size of the switch itself, thereby avoiding formation of electric arcs between these contact points, particularly if the switch is used in high altitudes.

It is a further object of the present invention to provide a diaphragm switch in which the diaphragm is not dished-type, thereby eliminating the setting up of stresses in the diaphragm.

Still another object of the present invention is to shape the diaphragm of a switch in such a way that it returns, after the end of the switching operation, into its initial position without provision of any return springs or the like.

It is still a further object of the present invention to provide a switch in which the movable contact members make a sliding contact with the stationary contact members, thereby cleaning themselves and the stationary contact members during the making and breaking of the contact.

Still another object of the present invention consists of a switch which needs no adjustment, may be operated by any mechanical, electric and hydraulic means and can be used for the most different purposes and made in many different types using the same new switch membrane.

Finally, a further object of the present invention consists in a switch in which the break gap between the contacts increases with the size of the switch, i. e., in which the break gap is proportional to the size of the diaphragm used; that means that the larger the diaphragm, the wider the break gap between the contacts in opened position of the switch.

With the above objects in view, my present invention mainly consists in using for switches a new type of switch membrane which consists of a metallic flexible and highly resilient thin plate made of sheet metal and curved in such a manner that, if it is supported at some portions of its edge area and pressure is exerted on its central part, it bends so that the unsupported freely movable portions of its edge area are bent and thus moved from their initial position in which they are when no pressure is exerted. These movable edge portions however return, by the resiliency of the membrane, into their initial position when the pressure exerted on the membrane ceases.

In accordance with the present invention, a membrane of this type is supported at some portions of its edge area and arranged in relation to the stationary contact members of the switch in such a manner that its movable edge portions are, in unbent position, opposite these contact members at a slight distance therefrom and are in contact with these members when the membrane is bent by exerting pressure on its central part. Naturally, movable operating means have to be provided which have to be adapted to exert pressure on the central part of the membrane and to bend thereby the movable edge portions into contact with the stationary contact members mentioned above. Thus, the new switch proposed herewith is closed by exerting pressure by the above mentioned movable operating means on the membrane and opened by releasing said operating means; in the latter case, said membrane snaps back and thus returns, by its own resiliency, into its initial position out of contact with the stationary contact members.

It is preferable to give the membrane the shape of a cylinder segment and to support it by the switch body at those edge portions of its outer surface which are at the ends of the crest line of this cylinder segment. The supports for the membrane have to be arranged in such a manner that in inoperative open position of the switch those portions of the membrane which are farthest from this crest line are positioned opposite the stationary contact members of the switch at a slight distance therefrom. In this case the switch closing member has to be adapted to exert pressure on the inner surface of this switch membrane substantially at the central portion thereof, bending by such pressure the contact making edge portions of the membrane into contact with the stationary contact members when the switch has to be closed.

It is evident that the membrane might also be arranged in such a manner that it is in contact with the stationary contact members in unbent inoperative position and that by exerting pressure by means of the operating member in the above described way it is bent out of contact with the stationary contact members, thereby opening the switch. The basic principle of this switch construction is the same as that of the switch described in the previous paragraph and therefore also this construction forms part of the present invention and is intended to be covered by the appended claims.

The novel features which I consider characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a top view of a membrane used for the new switch;

Figure 2 is a cross section through the membrane shown in Fig. 1 along line 2—2 of that figure;

Figure 3 is another cross section through this membrane along line 3—3 of Fig. 1;

Figures 4 and 5 are two cross sections of the same membrane shown in bent position;

Figure 6 is a plane view of a modified membrane;

Figure 7 is a cross section of the membrane shown in Fig. 6 along line 7—7 of that figure;

Figure 8 is a longitudinal section through a switch embodying a membrane of the type shown in Figs. 6 and 7;

Figure 9 is a view of the body of the switch shown in Fig. 8 seen in direction of arrow 9 of that figure;

Figure 10 is a cross section through the switch body shown in Fig. 9 along line 10—10 of that figure;

Figure 11 is another cross section of the switch body along line 11—11 of Fig. 9;

Figures 12 and 13 are side and top views of an insulating insert used for the switch shown in Fig. 8;

Figure 14 shows a detail of the switch shown in Fig. 8 in closed contact making position;

Figure 15 is a top view of the switch body of another modified embodiment of the new switch;

Figure 16 is a cross section through the switch body shown in Fig. 15 along line 16—16 of that figure;

Figures 17 and 18, 19 respectively show two types of stationary contact plates used for the switch the body of which is shown in Figs. 15 and 16; and Figure 20 is a cross section through an assembled switch body of the type shown in Figs. 15 and 16 along line 20—20 of Fig. 15.

Before proceeding with a detailed description of the switches embodying the new membrane type, this membrane and its mode of operation should be described in detail. As stated above, the membrane is made of flexible, highly resilient thin sheet metal, preferably hardened beryllium copper. A preferably round plate cut from a thin sheet of beryllium copper is used and bent into the shape of a cylinder segment. A membrane 21 of this type is shown in Figures 1 to 3 supported by two supporting members 22 and 23 at those edge portions 24 and 25 of its outer surface 26 which are at the ends of the crest line of the cylinder segment. The term "crest line" as used above and in the following detailed description and claims is intended to define that straight line on the outer surface of the cylinder segment which is formed by the highest points of this segment, i. e., that line which connects points 24 and 25 of the membrane shown in Figure 1. Those parts of the membrane which are farthest from this crest line are designated in the figure with the numerals 27 and 28.

If pressure is exerted in direction of arrow 29 on the central part 30 of the inner surface of the membrane 21, the same will bend into the shape shown in Figures 4 and 5. From these figures it is clear that the edge portions 24 and 25 remain in their initial position while the edge portions 27 and 28 are bent, together with the central part 30 of the membrane, in the way shown in Figure 4. Comparison of Figures 2 and 4 proves that during exertion of pressure the edge portions 27 and 28 move a considerable distance which movement can be used for closing the switch, as will be described in detail later.

Figures 6 and 7 show a modified embodiment of the membrane shown in Figures 1 to 3; in this embodiment preferably flat projections 31 and 32 are provided at the edge portions 27 and 28 of membrane 21. These projections move together with the movable bending edge portions 27 and 28 when pressure is exerted on the central portion 20 of the membrane. Figure 7 is a cross section of the modified membrane shown in Figure 6 and shows in full lines the projections 31 and 32 of the membrane in initial unbent position, before pressure is exerted, and in dotted lines after pressure has been exerted on the central part 30 of the membrane in direction of arrow 29. It is easily understood that the distance between these projections in their initial and bent positions is greater than that of the membrane itself, thereby making the use of such membranes especially advantageous for switches.

Of course, also this membrane has to be supported at its edge portions 24 and 25 in the same way as described above in connection with the membrane shown in Figures 1 to 3.

As shown in Figures 6 and 7, small contact plates 33 and 34 may be secured to the projecting parts 31 and 32 for making contact with the stationary contact members of the switch described below in detail.

Figure 8 shows a switch according to the present invention embodying a membrane 21 of the above described type. This switch consists of a switch body 35 provided with two stationary contact members 36 and 37 of known type. A switch cover 38 is secured in the way shown to the switch body 35 housing the membrane 31 and the insulating insert 39. The plunger 40 is held by means of spring 41 arranged between this plunger and the plunger cap 42 in permanent contact with the membrane.

As shown in Figures 9 to 11, the switch body 35 is provided with a recess 43 having a rectangular cross section and forming two supports 44 and 45. These supports 44 and 45 are provided with arc-shaped cut-outs 46 and 47 forming a membrane seat into which fit the edge portions 24 and 25 of the membrane 21. It should be noted that these arc-shaped supporting cut-outs 46 and 47 may be provided, as shown in these figures, with sloping portions 48 and 49 enabling easier bending of the membrane 21 if pressure is exerted on it by the plunger 40. As furthermore shown in the same figures, a projection 50 is provided on the bottom of recess 43, limiting the movement of the membrane 21 when pressed down by the plunger 40.

Although not forming part of the present invention, the insulating insert 39 is shown in detail in Figures 12 and 13 in order to enable clearer understanding of the new switch construction. This insulating insert 39 is provided with two projections 51 and 52 fitting into the recess 43 of the switch body 35. In this way any short circuits between the stationary contact members 36 and 37 are avoided with certainty.

The above described new switch operates as follows: In inoperative open position of the switch the membrane 21 and the plunger 40 are in their initial position shown in Figure 8. In this position the membrane 21 is supported at its edge portions 24 and 25 by the membrane seat formed by the arc-shaped cut-outs 46 and 47; it has the shape of a cylinder segment provided with projections as shown in Figures 6 and 7. For closing the switch, i. e., for establishing contact between the contact plates 33 and 34 secured to the projecting portions 31 and 32 of the membrane and the stationary contact members 36 and 37 secured to the stationary switch body 35, the plunger cap 42 is pushed in direction of arrow 9. The pressure exerted by the plunger cap 42 during this movement is transmitted by spring 41 unto the plunger 40 which presses on membrane 21 and bends the same as shown in Figure 14. In this bent position, the contact plates 33 and 34 of the membrane are in contact with the stationary contact members 36 and 37, thereby closing the switch. As shown in this figure, projection 50 limits travel of the plunger 40 and bending of membrane 21, thereby ensuring correct relative position of the movable contact plates 33, 34 and the stationary contact members 36, 37 while the switch is closed.

To open the switch, it is only necessary to release the plunger cap 42 and the inherent resiliency of membrane 42 will force the same to snap back into its initial position shown in Figure 8, simultaneously pushing also plunger 40 and plunger cap 42 back into their initial positions. It should be noted that the spring 41 has to be dimensioned so as to be strong enough to keep the plunger in permanent contact with the membrane 21 but weak enough to avoid bending of the membrane without additional switch operating pressure on the plunger cap 42 in direction of arrow 9. This additional pressure can be exerted manually but of course it is also possible to cause this pressure by mechanical, hydraulic or electric means.

The same basic new principle on which the above described double-break switch mechanism is founded can also be used for a double-contact switch of the type shown in Figures 15 to 20. The switch shown in these figures is constructed in such a manner as to make contact alternately between two pairs of stationary contact members, i. e., to establish contact either between one pair of these stationary contacts or the other. In view of the fact that the switch membrane, the membrane seat 58 supporting the membrane, and the plunger, spring and plunger cap are of the same construction as the corresponding parts of the double-break switch described above, these details will not be described below.

The main difference between the two switches lies in the construction of the switch body and of the stationary contact members; as shown in Figures 15 and 16, the switch body 53 of this double-contact switch is provided with two contact pairs consisting each of two co-operating contact members 54, 55 and 56, 57 respectively. Each of these contact members is provided with a contact screw 61 as shown in Fig. 20. The only difference between the contact members of the two contact pairs is that one contact pair is provided with flat contact plates 59 as shown in Fig. 17 while the other contact pair is equipped with twice bent contact plates 60 of the type shown in Figures 18 and 19.

The operation of this switch will be clear from the cross section of the assembled switch body shown in Fig. 20: the switch membrane 21 is supported on the membrane seat 58 in such a way that in unstressed initial position its projecting portions 31 and 32 are in contact with the contact plates 60 forming part of the contact members 54 and 55. In this position, the membrane 21 establishes contact between the contact members 54 and 55, closing the electric circuit of which these contact members form part. If the plunger cap is pressed down in the way described above the switch membrane is bent as shown in Fig. 7, breaking thereby the contact between the contact members 54 and 55 and contacting the flat contact plates 59 of the contact members 56, 57 of the other contact pair, closing thereby the circuit which includes this latter pair of contacts. When the plunger cap is released, the switch membrane snaps back into its initial position, breaking the contact between the contact members 56, 57 and again closing the contact between the contact members 54, 55.

It should be stressed that the main feature of the present invention consists in the new type of switch membrane described above. As easily understood from the above description of two embodiments of the present invention, it is possible to embody the new switch membrane into switches of the most different types without any difficulty. Thus, for instance, besides the above described switch constructions, using the new switch membrane makes it easy to construct a switch which is closed when the membrane is in its initial unbent position having the shape of a cylinder segment and opened when the plunger cap is pushed down and the membrane bent into the shape shown in Figures 4 and 5. For this purpose, it is necessary only to omit from the switch construction shown in Figures 15 to 20 the contact members 56 and 57 and the switch will then work in the above described way. Other embodiments making use of the new switch membrane proposed by me are therefore also intended to form part of the present invention.

It will be understood that each of the elements described above, or two or more together, may also find a useful application in other types of switches differing from the types described above.

While I have illustrated and described the invention as embodied in double-break and double-contact switches, I do not intend to be limited to the details shown, since various modifications and structural changes may be made without departing in any way from the spirit of my invention.

What I claim as new and desire to secure by Letters Patent is:

1. An electric switch comprising a switch body, two contact members carried by said body and being electrically insulated from each other, a switch membrane for making contact between said contact members consisting of a metallic flexible and resilient plate being curved in such a manner that if it is supported on its outer surface at some portions of its lateral edge area and pressure is exerted on the central part of its inner surface it bends so that the unsupported freely movable portions of its edge area are moved from their initial position in which they are when no pressure is exerted, said movable edge portions returning however, by the resiliency of said plate, into their initial position when said pressure ceases, said membrane being supported on its outer surface at some portions of its edge area and arranged in relation to said contact members in such a manner that said movable edge portions are, in unbent position, opposite said contact members at a slight distance therefrom and are in contact with the said members when said membrane is bent by exerting pressure on the central part of its inner surface, and movable operating means adapted to exert pressure on the concave surface of said central part of the membrane and to bend thereby said movable edge portions into contact with said contact members, said switch thus being closed by exerting pressure by said movable operating means on said membrane and opened by ceasing to press by said operating means on the same, enabling in the latter case said membrane to return by its own resiliency into its initial position out of contact with said contact members.

2. An electric switch comprising a switch body, two contact members carried by said body and being electrically insulated from each other, a switch membrane for making contact between said contact members, said switch membrane having the shape of a cylinder segment and being supported at a slight distance from said contact members in such a manner that, by pressure on its center, portions of its edge area are flexing into contact with said contact members, and means adapted to exert pressure on the center of said membrane against the concave surface of the membrane, bending thereby said flexible edge portions into contact with said contact members when said switch has to be closed.

3. An electric switch comprising a switch body, two contact members carried by said body and being electrically insulated from each other, a switch membrane for making contact between said contact members, said membrane consisting of a metallic flexible and resilient plate having the shape of a cylinder segment so that if it is supported from the convex face at the ends of the cylinder and pressure is exerted on the central part of its inner surface the unsupported freely movable portions of the edge area of said membrane are bent and thus moved from their inoperative position in which they are when no pressure is exerted, said movable edge portions returning however, when said pressure ceases, by the resiliency of said plate into their initial position in which they were before said pressure had been exerted, means for supporting said membrane on its outer surface at the ends of its cylindrical length, arranged in relation to said contact members in such a manner that said movable edge portions are, in unbent position, opposite said contact members at a slight distance therefrom and are in contact with the said members when said membrane is bent by exerting pressure on the central part of its inner surface, and movable operating means adapted to exert pressure on said central part of the membrane from the inside outwardly and to bend thereby said movable edge portions into contact with said contact members, said switch thus being closed by exerting pressure by said movable operating means on said membrane and opened by ceasing to press by said operating means on the same, enabling in the latter case said membrane to return by its own resiliency into its initial position out of contact with said contact members.

4. An electric switch comprising a switch body, two contact members carried by said body and being electrically insulated from each other, a membrane made of flexible highly resiliently sheet metal for making contact between said contact members, said membrane having the shape of a cylinder segment and being supported in such a manner by said switch body at those edge portions which are at the ends of the crest line of said cylinder segment that in inoperative open position of said switch those portions of said membrane which are farthest from said crest line are positioned opposite said contact members at a slight distance therefrom, and a switch closing member adapted to exert pressure on the inner surface of said switch membrane substantially at the central portion thereof, flexing thereby the contact making portions of said membrane positioned in inoperative position opposite said contact members into contact with the same when said switch has to be closed.

5. An electric switch comprising a switch body, two contact members carried by said body and being electrically insulated from each other, a substantially round membrane made of flexible, highly resilient sheet metal and bent into the shape of a cylinder segment and being supported in such a manner by said switch body at those edge portions of its outer surface which are at the ends of the crest line of said cylinder segment that in inoperative open position of said switch those portions of said membrane which are farthest from said crest line are positioned opposite said contact members at a slight distance therefrom, and a switch closing member adapted to exert pressure on the inner surface of said switch membrane substantially at the central portion thereof, flexing thereby the contact making portions of said membrane positioned in inoperative position opposite said contact members into contact with the same when said switch has to be closed.

6. An electric switch comprising a switch body, two contact members carried by said body and being electrically insulated from each other, a switch membrane for making contact between said contact members consisting of a metallic flexible and resilient plate being curved in such a manner that if it is supported at some portions of its edge area and pressure is exerted on its central part it bends so that the unsupported freely movable portions of its edge area are moved from their initial position in which they are when no pressure is exerted, said movable edge portions returning however, by the resiliency of said plate, into their initial position when said pressure ceases, said membrane being supported at some portions of its edge area and arranged in relation to said contact members in such a manner that said movable edge portions are, in unbent position, opposite said contact members at a slight distance therefrom, facing them with their outer surfaces, and are in contact with the said members when said membrane is bent by exerting pressure on its central part, and movable operating means adapted to exert pressure against said central part of the membrane and to bend thereby said movable edge portions into contact with said contact members, said switch thus being closed by exerting pressure by said movable operating means on said membrane and opened by ceasing to press by said operating means on the same, enabling in the latter case said membrane to return by its own resiliency into its initial position out of contact with said contact members.

7. An electric switch comprising a switch body, two contact members carried by said body and being electrically insulated from each other, a switch membrane for making contact between said contact members consisting of a metallic flexible and resilient plate being curved in such a manner that if it is supported at some portions of its edge area and pressure is exerted on its central part it bends so that the unsupported freely movable portions of its edge area are moved from their initial position in which they are when no pressure is exerted, said movable edge portions returning however, by the resiliency of said plate, into their initial position when said pressure ceases, said membrane being supported at some portions of its edge area and arranged in relation to said contact members in such a manner that said movable edge portions are in unbent position when no pressure is exerted on said membrane, with their inner surfaces in contact with said contact members, and are in bent position when said membrane is bent by exerting pressure on its central part, opposite said contact members at a slight distance therefrom facing them with their inner surfaces, and movable operating means adapted to exert pressure against said central part of said membrane and to bend thereby said movable edge portions out of contact with the contact members, said switch thus being closed when no pressure is exerted on said membrane and opened by exerting pressure by said movable operating means on the central part of said membrane.

8. A switch disc of spring material, laterally curved to provide a concave inner and convex outer surface extending longitudinally of the crest of the convex surface and of curved perimeter, supports for the outer convex surface at the longitudinal ends of the disc, insulated fixed contacts from which the convex surfaces at the lateral limits of the disc are normally spaced but with which they are adapted to engage when the disc has been thrown and means for throwing the disc as a switch, engaging the disc in the middle area of the concave surface of the disc and pressing said middle area in the direction of the convex surface of the disc.

9. In a switch, a contact disc of spring material laterally curved to provide a concave inner and convex outer surface extending longitudinally of the crest of the convex surface, supports for the outer convex surface at the longitudinal ends of the disc, fixed contacts from which the convex surfaces at the lateral limits of the disc are normally spaced but with which they are adapted to engage when the disc has been thrown, and a spring-pressed plunger engaging the middle interior area of the disc for throwing the disc as a switch, and pressing said middle area toward the convex surface of the disc.

10. In a switch, a contact disc of spring material laterally curved to provide a concave inner and convex outer surface extending longitudinally of the crest of the convex surface, supports for the outer convex surface at the longitudinal ends of the disc, fixed contacts from which the convex surfaces at the lateral limits of the disc are normally spaced but with which they are adapted to engage when the disc has been thrown, movable contacts on the exterior surface of the disc at a distance from the crest of this surface, and means for throwing the disc as a switch, engaging the disc in the middle area of the concave surface of the disc and pressing said middle area toward the convex surface of the disc.

11. In a switch, a contact disc of spring material laterally curved to provide a concave inner and convex outer surface extending longitudinally of the crest of the convex surface and of curved perimeter, supports for the outer convex surface at the longitudinal ends of the disc, fixed contacts from which the convex surfaces at the lateral limits of the disc are normally spaced but with which they are adapted to engage when the disc has been thrown, movable contacts on the exterior of the surface of the disc at a distance from the crest of this surface, and means for throwing the disc as a switch, engaging the disc in the middle area of the concave surface of the disc and pressing said middle area toward the convex surface of the disc.

12. In an electric switch, a casing having a recess, fixed contacts exposed within the interior of one end of the casing, insulation spacing the contacts, a plunger movable longitudinally of the casing out of line with the contacts, spring-retracted operating means for the plunger, supports at opposite sides of the recess, a spring disc mounted at opposite disc ends upon said supports and extending across the recess, normally adjacent to but spaced from said contacts, the disc being concave in its face away from the contacts and, at the middle part of its concave face, engaged by the plunger, and movable contacts carried by the convex surface of the disc near the lateral edges thereof and adapted with movement of the plunger to engage the fixed contacts.

13. In an electric switch, a casing having a recess, fixed contacts exposed within the interior of one end of the casing, insulation spacing the contacts, a plunger movable longitudinally of the casing out of line with the contacts, spring-retracted operating means for the plunger, supports at opposite sides of the recess, a spring disc mounted at opposite disc ends upon said supports and extending across the recess, normally adjacent to but spaced from said contacts, the disc being concave in its face away from the contacts and, at the middle part of its concave face, engaged by the plunger, movable contacts carried by the convex side of the disc near the lateral edges thereof and adapted with movement of the plunger to engage the fixed contacts and a stop limiting the movement of the disc.

14. In an electric switch, a casing having a recess, fixed contacts exposed within the interior of one end of the casing, insulation spacing the contacts, a plunger movable longitudinally of the casing out of line with the contacts, spring-retracted operating means for the plunger, supports at opposite sides of the recess, an approximately circular spring disc mounted at opposite disc ends upon said supports and extending across the recess, normally adjacent to but spaced from said contacts, the disc being concave in its face away from the contacts and, at the middle part of its concave face, engaged by the plunger, and movable contacts carried by the convex side of the disc near the lateral edges thereof and adapted with movement of the plunger to engage the fixed contacts.

15. In a switch, a switch casing, a metallic, flexible and resilient concaved disc extending lengthwise, transversely of the casing, supports for the convex faces of the ends of said disc, movable contacts carried by the lateral convex surfaces of said disc near the edges of the disc, fixed contacts within the casing insulated from each other, adapted to be engaged by the movable contacts and means engaging the middle area of the concave surface of said disc to move the middle of the disc toward its convex middle surface.

16. In a switch, a switch casing, a metallic, flexible and resilient concaved disc extending lengthwise, transversely of the casing, supports for the convex faces of the ends of said disc, movable contacts carried by the lateral convex surfaces of said disc near the edges of the disc, fixed contacts within the casing insulated from each other, adapted to be engaged by the movable contacts, means engaging the middle area of the concave surface of said disc to move the middle of the disc toward its convex middle surface and a stop to limit the movement of the disc.

CHARLES L. COX, Jr.